(12) United States Patent
Pedersen

(10) Patent No.: US 6,491,244 B2
(45) Date of Patent: Dec. 10, 2002

(54) CONDIMENT GRINDER APPARATUS

(76) Inventor: Bennie Peder Smiszek Pedersen, Bregentvedvej 48, Haslev 4690 (DK)

( * ) Notice: Subject to any disclaimer, the term of this patent is extended or adjusted under 35 U.S.C. 154(b) by 36 days.

(21) Appl. No.: 09/804,797

(22) Filed: Mar. 14, 2001

(65) Prior Publication Data

US 2002/0130208 A1 Sep. 19, 2002

(51) Int. Cl.⁷ ................................................. A47J 42/04
(52) U.S. Cl. .................................. 241/169.1; 241/259.1
(58) Field of Search ............................. 241/100, 169.1, 241/168, 259, 259.1

(56) References Cited

U.S. PATENT DOCUMENTS

| 2,060,807 | A |   | 11/1936 | Johnston |           |
|-----------|---|---|---------|----------|-----------|
| 4,709,865 | A |   | 12/1987 | Bounds   |           |
| 4,844,352 | A | * | 7/1989  | Griffin  | 241/101.2 |
| 4,925,150 | A |   | 5/1990  | Tedioli  |           |
| 5,088,652 | A | * | 2/1992  | Chen     | 241/169.1 |

FOREIGN PATENT DOCUMENTS

| DE | 7112118-9    | 12/1975 |
| DE | 3124348      | 5/1983  |
| DE | 0 876 787 A1 | 11/1998 |
| FR | 749911       | 8/1933  |
| FR | 2112621      | 6/1972  |

* cited by examiner

Primary Examiner—John M. Husar
(74) Attorney, Agent, or Firm—Jack C. Munro

(57) ABSTRACT

A condiment grinder apparatus which includes a pair of condiment grinders each of which are to dispense a different condiment. The dispensing of both condiments are from the same end surface of the condiment grinder. Operation of one condiment grinder is by turning an actuator in a clockwise direction and operation of the second condiment grinder is by turning of the actuator in a counterclockwise direction.

9 Claims, 5 Drawing Sheets

CONDIMENT GRINDER APPARATUS

BACKGROUND OF THE INVENTION

1. Field of the Invention

This invention is related to grinders and more particularly to a condiment grinder for grinding of condiments such as salt, pepper, paprika and so forth with the grinder to be usable within the kitchen and on a dining table.

2. Description of the Related Art

Dispensers for condiments, such as salt and pepper, are in exceedingly common usage. Most frequently, these dispensers require that the condiment be pulverized before it be placed within the dispenser. This pulverizing of the condiment prior to usage causes the condiment to lose some of its flavor because of the normal length of time that occurs from the pulverization until usage of the condiment. A substantially increased amount of flavor can be obtained from the condiment if it is pulverized precisely just prior to consuming of the food to which the condiment has been applied.

In the past, there have been designed condiment grinders, such as a pepper grinder and a salt grinder, that are capable of being used to pulverize the condiment just prior to consuming of the food. It is normal that each condiment grinder is located on the dining table so that the condiment grinder is available for usage to each of the diners when desired. It would be desirable to instead of having two separate condiment grinders if somehow the two grinders could be constructed into one unit thereby eliminating the need of having two separate devices and where one device could be utilized to dispense two separate condiments, such as salt and pepper.

SUMMARY OF THE INVENTION

In one embodiment of this invention there is disclosed a condiment grinder apparatus in the form of an elongated cylindrical housing which has an upper end and a lower end. A first condiment grinder is rotatably mounted at the lower end of the housing. A first condiment storage chamber, which is located between the upper end and lower end, connects to the first condiment grinder. A second condiment grinder is also mounted in the cylindrical housing and is located at the lower end and there is also a second condiment storage chamber located between the upper end and the lower end which is adapted to feed condiment to the second condiment grinder. During operation of the first condiment grinder, the second condiment grinder is not operable and vice versa.

In another embodiment of this invention, there is disclosed a condiment grinder wherein the axes of rotation of both the first condiment grinder and the second condiment grinder are coinciding.

In a further embodiment of this invention, the first condiment storage chamber is located alongside the second condiment storage chamber.

In another embodiment of this invention, the first condiment storage chamber is defined as being identical in size to the second condiment storage chamber.

In another embodiment of this invention, the cylindrical housing of the condiment grinder apparatus includes a manually rotatable activator located at the upper end. Rotation of this activator causes operation of both the first condiment grinder and the second condiment grinder.

In a further embodiment of this invention, the activator, when rotated in one direction, causes operation of the first condiment grinder and rotation in an opposite direction causes operation of the second condiment grinder.

In yet a further embodiment of this invention, the first condiment grinder is directly attached to a shaft as is also the activator and rotation of the activator in the one direction causes rotation of the shaft and rotation of the first condiment grinder.

In a still further embodiment of this invention, the shaft is defined as having an upper ratchet gear mounted thereon with this upper ratchet gear to connect to a middle ratchet gear. Rotation of the activator in the opposite direction causes the upper ratchet gear to engage with the middle ratchet gear and cause rotation of the second condiment grinder.

In a still further embodiment of this invention, there is a lower ratchet gear which is attached to the cylindrical housing. The middle ratchet gear is to engage with the lower ratchet gear during rotation of the activator in the one direction which fixes the second grinder to the cylindrical housing.

In yet another embodiment of this invention, there is defined a condiment grinder apparatus wherein the second condiment grinder is concentrically located about the first condiment grinder.

In a still further embodiment of this invention, there is defined the activator being separable from the cylindrical housing in order to gain access into the first condiment storage chamber and second condiment storage chamber for the purpose of supplying condiments into these chambers.

In yet a still further embodiment of this invention, there is incorporated a spring in conjunction with the ratchet gears with this spring functioning to exert a continuous bias tending to connect together these ratchet gears.

In yet a still further embodiment of this invention, there is defined a condiment grinder apparatus which includes a plug mounted in conjunction with the activator. The plug is defined as being attached to the shaft. When the plug is disconnected from the shaft, the activator is defined as being separable from the cylindrical housing.

In yet a still further embodiment of this invention, the plug is to be movable between a retracted position and an extended position. With the plug in the retracted position, the plug is locatable substantially flush with the upper end of the cylindrical housing and does not provide access to the plug to operate the plug to disconnect the plug from the shaft. With the plug in the extended position, the plug can be manually operated to disconnect such from the shaft and permit disengagement of the activator from the cylindrical housing.

A primary objective of the present invention is to construct a condiment grinder which can be operated to dispense two different condiments.

Another objective of the present invention is to construct a condiment grinder where the two different condiments are dispensable from one end of the condiment grinder.

Another objective of the present invention is to construct a condiment grinder apparatus where the condiment storage compartments are locate side-by-side in where the outer wall of the storage compartments constructed of a transparent plastic material so that the amount of condiment contained within each storage chamber can be readily observed thereby making known to the user when it is time to refill any one of the storage chambers with condiment.

Another objective of the present invention is to construct a condiment grinder apparatus which is operable to dispense both condiments by using a single activator.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF THE INVENTION

Figure 1:
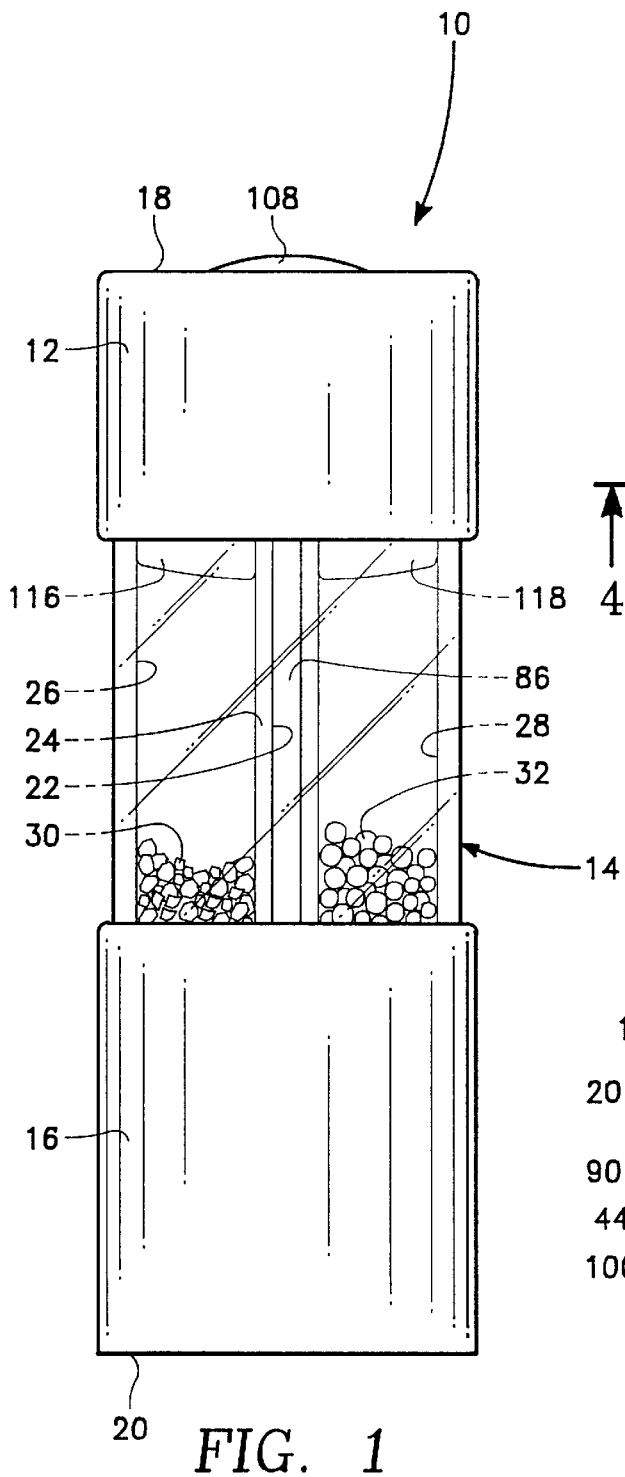
FIG. 1 is an external side elevational view of the condiment grinder apparatus of the present invention.
Figure 2:
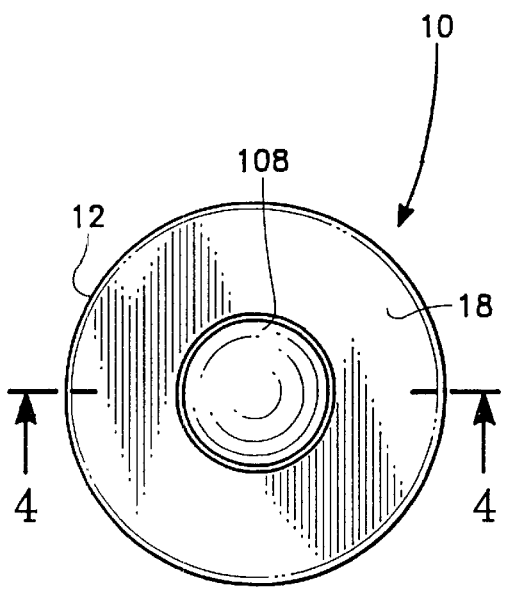
FIG. 2 is a top plan view of the condiment grinder apparatus of this invention.
Figure 3:
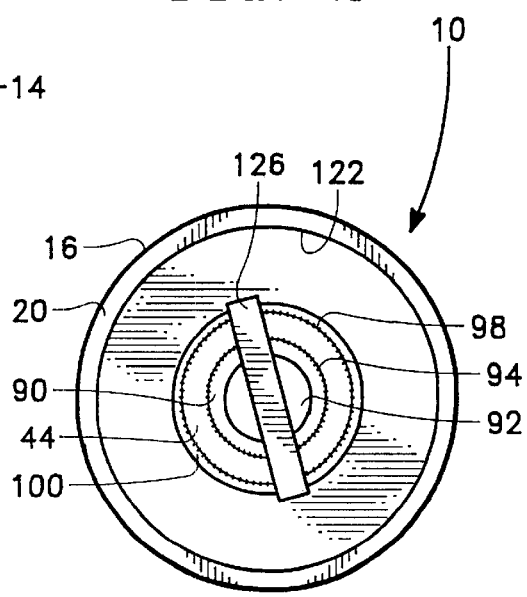
FIG. 3 is a bottom plan view of the condiment grinder apparatus of this invention.

Referring particularly to the drawings, there is shown in FIG. 1 the condiment grinder apparatus 10 of this invention. The condiment grinder apparatus 10 is basically cylindrical in configuration and is comprised generally of a cylindrically shaped cap 12 which is mounted on an intermediate section 14 and a base 16. The intermediate section 14 is to be constructed of a transparent material, such as plastic or glass. The cap 12 has an upper surface 18 and the base 16 has a lower surface 20. The lower surface 20 is parallel to the upper surface 18. The upper surface 18 constitutes the very top of the condiment grinder apparatus 10. The lower surface 20 constitutes the very bottom of the condiment grinder apparatus 10. The diameter of the upper surface 18 is equal to the diameter of the lower surface 20. However, there is actually no real reason for having these diameters to be precisely the same.

Figure 4:
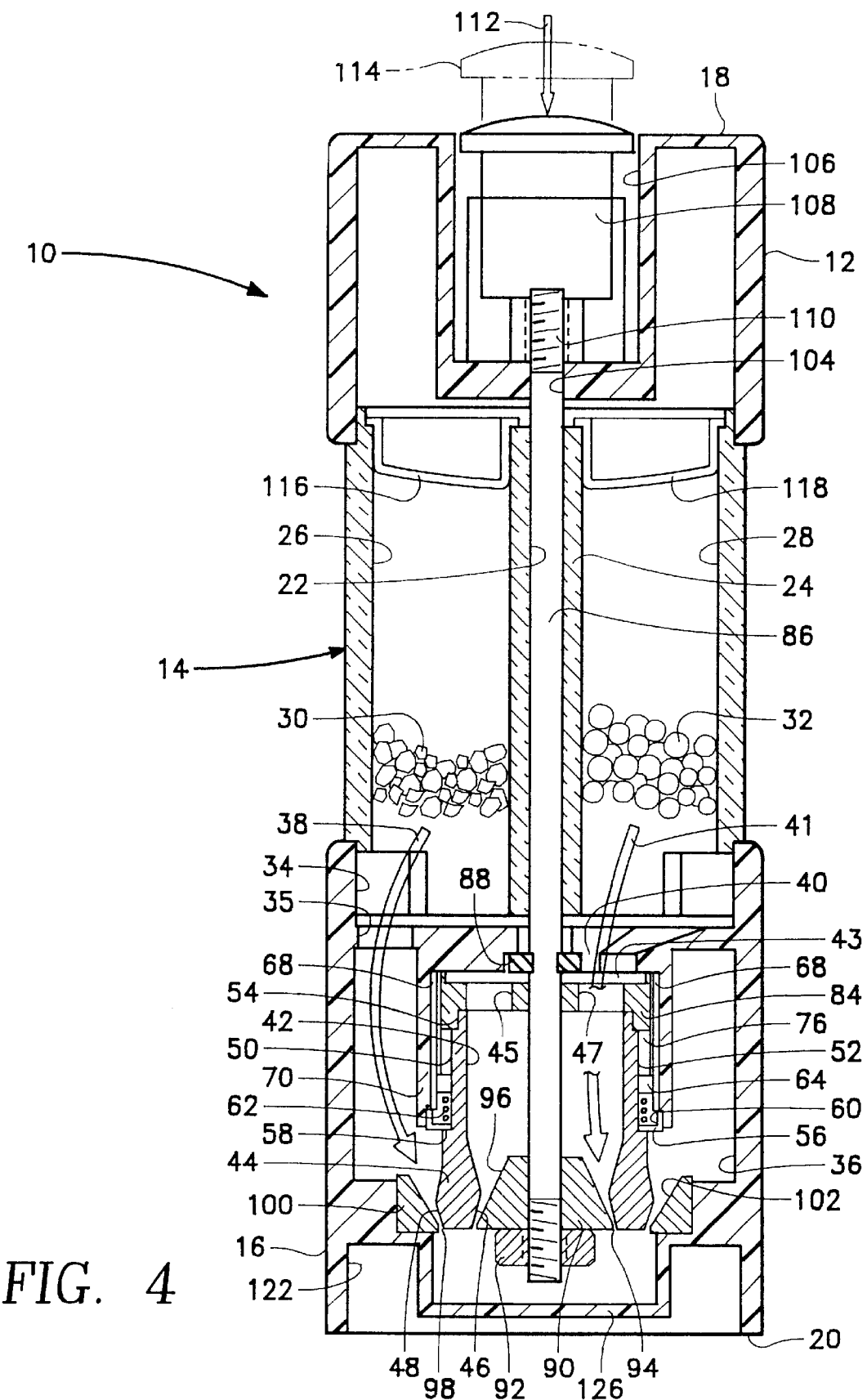
FIG. 4 is a longitudinal cross-sectional view of the condiment grinder apparatus of this invention taken along line 4—4 of FIG. 2.
Figure 5:
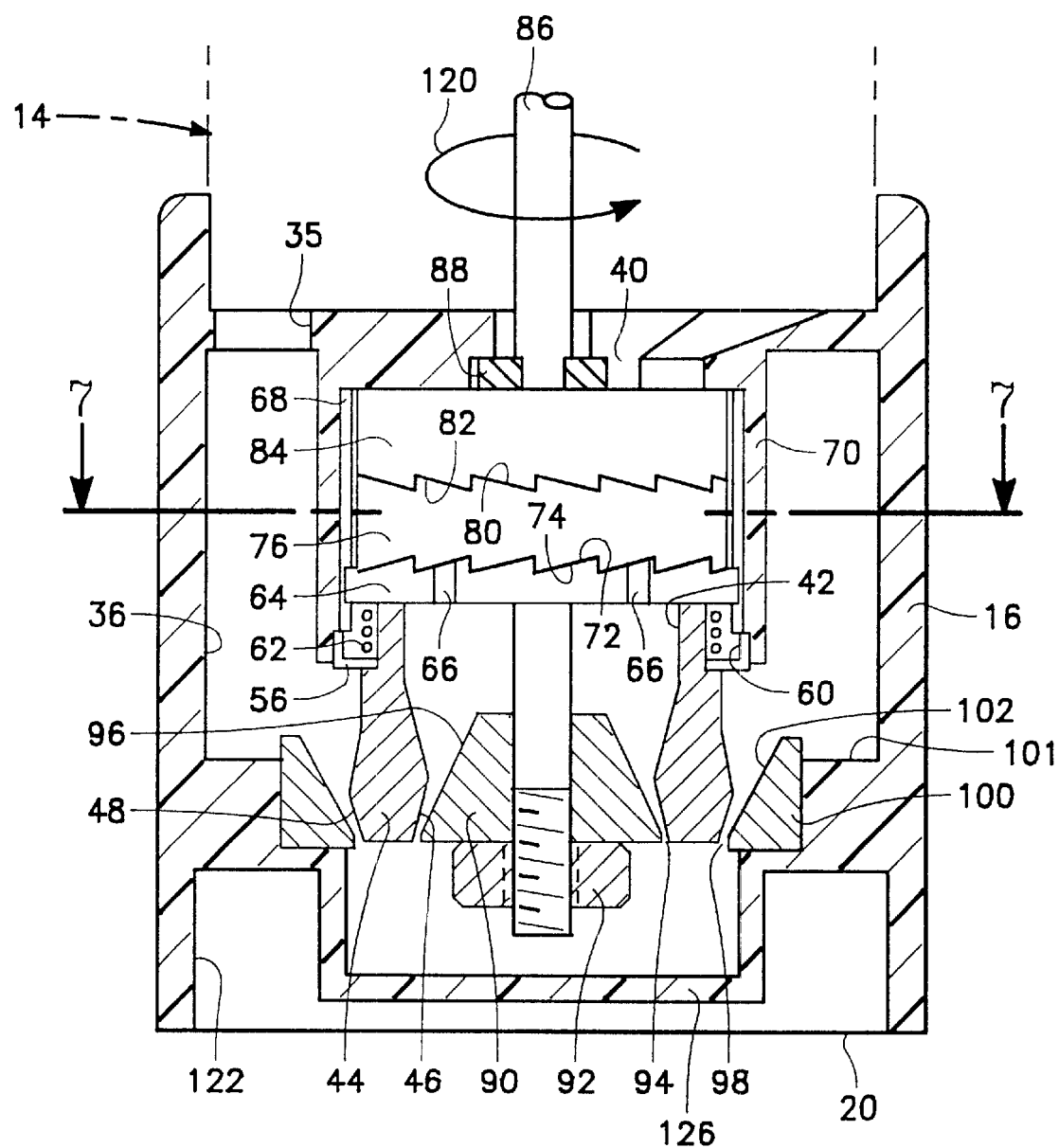
FIG. 5 is a cross-sectional view through the grinders that are incorporated within the condiment grinder apparatus of this invention showing the grinders in the position of grinding one of the condiments.

The intermediate section 14 has a hole 22 passing longitudinally centrally therethrough. Hole 22 is formed within a barrier wall 24 which extends entirely across the intermediate section 14. Located on one side of the barrier wall 24 is a first condiment storage chamber 26. Located on the opposite side of the barrier wall is a second condiment storage chamber 28. Both the first condiment storage chamber 26 and the second condiment storage chamber 28 are each in a substantially semi-cylindrical shape and each would comprise one-half of a cylinder were it not for the thickness of the barrier wall 24. Both chambers 26 and 28 are located alongside of each other and are of the same size in transverse cross-section and of the same length. The first condiment storage chamber 26 is designed to contain a certain type of one condiment, such as salt 30 in granule form. The second condiment storage chamber 28 is designed to contain a quantity of a second condiment, such as peppercorns 32. The granules of salt 30 are designed to feed into funnel 34 through opening 35 and into first annular grinding chamber 36 which is formed within the base 16. This feeding of the salt 30 into the first annular grinding chamber 36 is depicted by means of arrow 38 shown in FIG. 4. The peppercorns 32 are designed to be conducted through funnel 40 into disc shaped chamber 43, through holes 45 and 47 into a second annular grinding chamber 42 as is depicted by arrow 41. The first annular grinding chamber 36 is concentrically located about the second annular grinding chamber 42.

Separating the chambers 36 and 42 is a grinding sleeve 44. The inner surface 46 of the grinding sleeve 44 is configured into an annular series of slanted grooves and ridges which are to function to form a grinding surface. The outer surface 48 of the grinding sleeve 44 is also similarly configured. The exterior surface of the grinding sleeve 44 includes an annular cutout 50. Located in an evenly spaced apart arrangement within the annular cutout 50 are a series (six in number) of longitudinally oriented rails 52. The rails 52 are constructed of the same material which is usually a ceramic material and are integral with the grinding sleeve 44. The rails 52 do not extend the entire length of the cutout 50 but terminate short of an annular recess 54 which is located at the upper end of the grinding sleeve 44 with the inner surface 46 and outer surface 48 being located at the bottom end of the grinding sleeve 44. A base ring 56 is mounted within the annular cutout 50 and is positioned against annular ledge 58 which defines the lower limit of the annular cutout 50. The base ring 56 defines an annular chamber 60. Located within the annular chamber 60 is a coil spring 62. Mounted within the cutout 50 and located about the rails 52 is a lower ratchet gear 64. This lower ratchet gear 64 is located exteriorly of the rails 52. The base ring 56 has a series of notches, which are not shown. Each notch is to connect with a rail 52. This means that the base ring 56 is rotationally locked to the grinding sleeve 44. It is to be understood that the coil spring 62 is positioned about the rails 52.

Formed within the exterior surface of the lower ratchet gear 64 are six in number of notches 66. Each notch 66 connects with a rail 68 which is integrally formed on a cover sleeve 70. This means that the lower ratchet gear 64 is locked to the cover sleeve 70 and the cover sleeve 70 is integral with the base 16. Therefore, the lower ratchet gear 64 is prevented from relative rotation relative to the base 16.

The lower ratchet gear 64 has an annular series of gear teeth 72. These gear teeth 72 are capable of engaging with a series of gear teeth 74 formed on a middle ratchet gear 76. The inside surface of the middle ratchet gear 76 includes a series of notches 78 which are evenly spaced apart with a single notch 78 to connect with a rail 52. This means that the middle ratchet gear 76 is rotationally locked to the grinding sleeve 44 but slight longitudinal movement of the middle ratchet gear 76 is permitted. The middle ratchet gear 76 has a second series of gear teeth 80. The gear teeth 80 are to be engageable with a series of gear teeth 82 formed on upper ratchet gear 84. This upper ratchet gear 84 is placed in the area of annular recess 54 and therefore does not connect with the rails 52. The upper ratchet gear 84 is mounted on a shaft 86. The upper ratchet gear 84 is mounted so as to not be rotational relative to the shaft 86. The upper ratchet gear 84 is prevented from any upward movement on the shaft 86 by means of a snap ring 88. Also, snap ring 88 prevents the shaft 86 from upward movement by snap ring 88 abutting against a portion of base 16. Disc shaped chamber 83 and holes 45 and 47 are formed in upper ratchet gear 84. Fixedly mounted on the lower end of the shaft 86 is a grinding block 90.

The grinding block 90 is adjustable in position on the shaft 86 by means of nut 92. In other words, the more the nut 92 is tightened, the narrower the gap 94 created between the grinding block 90 and the grinding sleeve 44. Obviously, the less the nut 92 is tightened the wider the gap 94. The peppercorns 92 are to be ground by being pulverized between surface 46 and exterior surface 96 of the grinding plug 90. The closer the exterior surface 96 is to inner surface 46, the finer the pepper that is produced. It is to be noted that the second annular grinding chamber 42 is intended to receive pepper because generally some pepper prefer finely ground pepper while other people prefer coarsely ground pepper. Therefore, the adjustability by the use of nut 92 is provided in order to achieve this fine or coarseness in the pepper that is produced. The salt granules 30 or other spice that is contained within the first annular grinding chamber 36 is not adjustable with the annular gap 98 located between the outer surface 48 of the grinding sleeve 44 and a grinding ring 100 which is of fixed dimension and is not adjustable. The grinding surface 102 of the grinding ring 100 is to include a series of ridges of different configuration in order to produce a roughened surface that also connects with the roughened configuration of the surface 48 so that a pulverization of the salt 30 will occur. The grinding ring 100 is mounted on base 16 next to annular surface 101 of first annular grinding chamber 36.

The upper end of the shaft 86 passes through hole 104 formed within cap 12. Cap 12 includes a deepened recess 106 centrally formed within the cap 12. Mounted within that recess 106 is a plug assembly 108. Plug assembly 108 is attached by screw threads 110 to the shaft 86. The plug assembly 108, by being pressed in a downward direction in the direction arrow 112 of FIG. 4, will either locate the plug assembly 108 in the retracted position, shown in the drawings, or will result in the plug assembly 108 assuming an extended position, which is shown in dotted lines 114 in FIG. 4 of the drawings. With the plug assembly in the retracted position, shown in FIGS. 1 and 4, the plug assembly is retracted and doesn't interfere with manually turning of the cap 12 with it being understood that the cap 12 functions as an activator for creating the grinding of both the salt granules 30 and the peppercorns 32. However, when it is desired to supply an additional quantity of salt granules 30 within the first condiment storage chamber 26, and an additional amount of the peppercorns 32 within the second condiment storage chamber 28, it is necessary for manual pressure to be applied in the direction of arrow 112 onto the plug assembly 108 which will result in the plug assembly 108 disengaging from a lock (not shown) and moving to the extended position 114. The user can then apply turning moment to the plug assembly 108 and disengage the plug assembly 108 from the shaft 86. This will permit the cap 12 to be removed. Cover plug 116 is then removed from the first condiment storage chamber 26 and cover plug 118 is removed from the second condiment storage chamber 28. Access into these storage chambers is now permitted to facilitate the supplying of the additional quantity of the salt granules 30 and the peppercorns 32. After the storage chambers 26 and 28 have been filled to the desired level, the cover plugs 116 and 118 are reinstalled in position, the cap 12 installed back in conjunction with the shaft 86 and then the plug 108 is then reconnected to the shaft 86. The plug 108 is then manually pressed in the direction of arrow 112 causing the plug 108 to again engage the lock (not shown) to assume the retracted position shown in the dotted lines in FIG. 4.

Let it now be assumed that the operator wishes to dispense salt from the salt granules 30. This dispensing will then occur from the annular grinding chamber 36 which is included in the first condiment grinder, and by turning of the cap 12 in the counterclockwise direction, as indicated by arrow 120, about an axis of rotation which coincides with the longitudinal center axis of shaft 86, the upper ratchet gear 84 will engage with the middle ratchet gear 76 with a slippage occurring between the gear teeth 72 and 74 with the middle ratchet gear 76 sliding on the lower ratchet gear 64. Since the middle ratchet gear 76 is locked by the rails 52 to the grinding sleeve 44, simultaneous counterclockwise pivoting movement will occur also of the grinding sleeve 44. Since grinding ring 100 is fixed, there is relative motion occurring between ring 100 and grinding sleeve 44. Some of the salt granules will fall between the grinding ring 100 and the grinding sleeve 44, and as the salt granules 30 pass through the gap 98, such will be pulverized and then discharged into bottom chamber 122 of the base 16. The cap 12 can be pivoted only a few degrees to dispense a small quantity of the pulverized salt, or actually can be rotated more than three hundred and sixty degrees to dispense a large quantity of salt. It is to be noted that during the dispensing of salt, the grinding block 90 also pivots with the grinding sleeve 44. Since there is no relative movement occurring between the grinding sleeve 44 and the grinding block 90, there is no dispensing of pepper.

Figure 6:
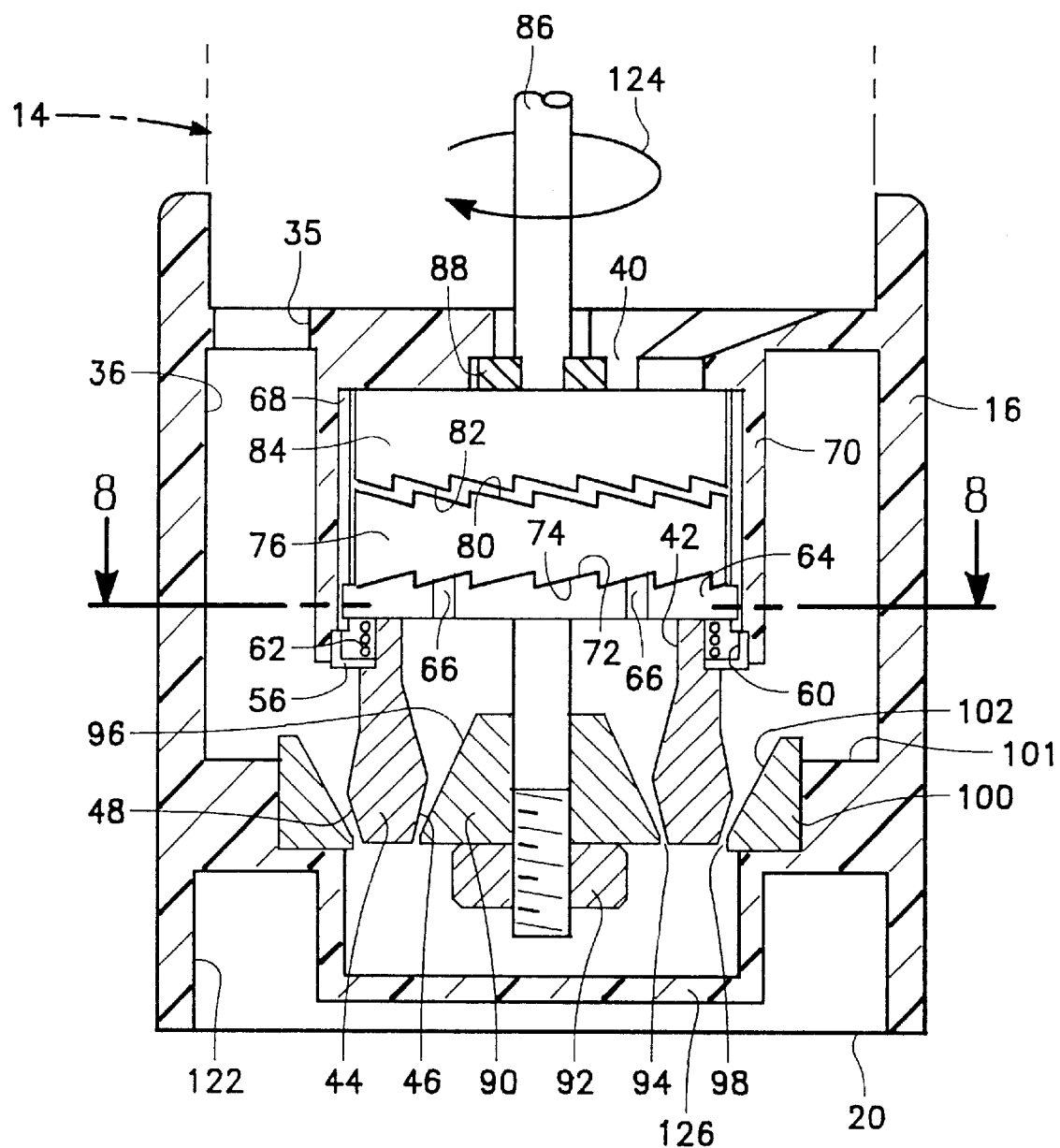
FIG. 6 is a cross-sectional view similar to FIG. 5 but showing the grinders in the position of grinding the other of the condiments.
Figure 7:
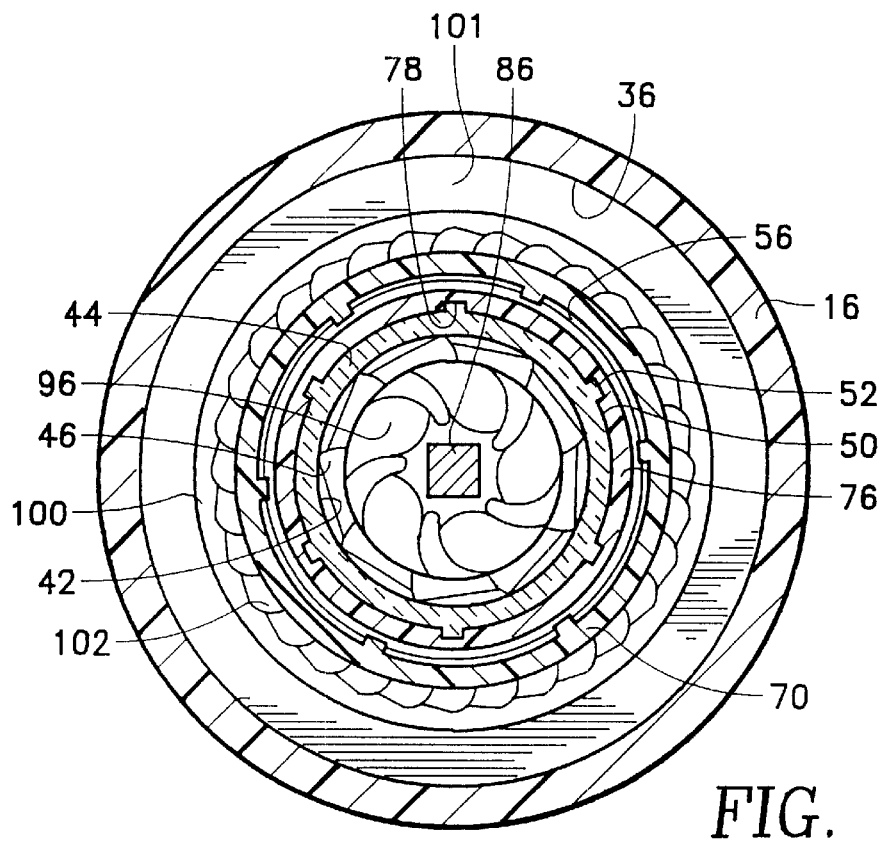
FIG. 7 is a cross-sectional view through a portion of the ratchet gear assembly that is utilized in conjunction with the condiment grinder apparatus of this invention taken along line 7—7 of FIG. 5.
Figure 8:
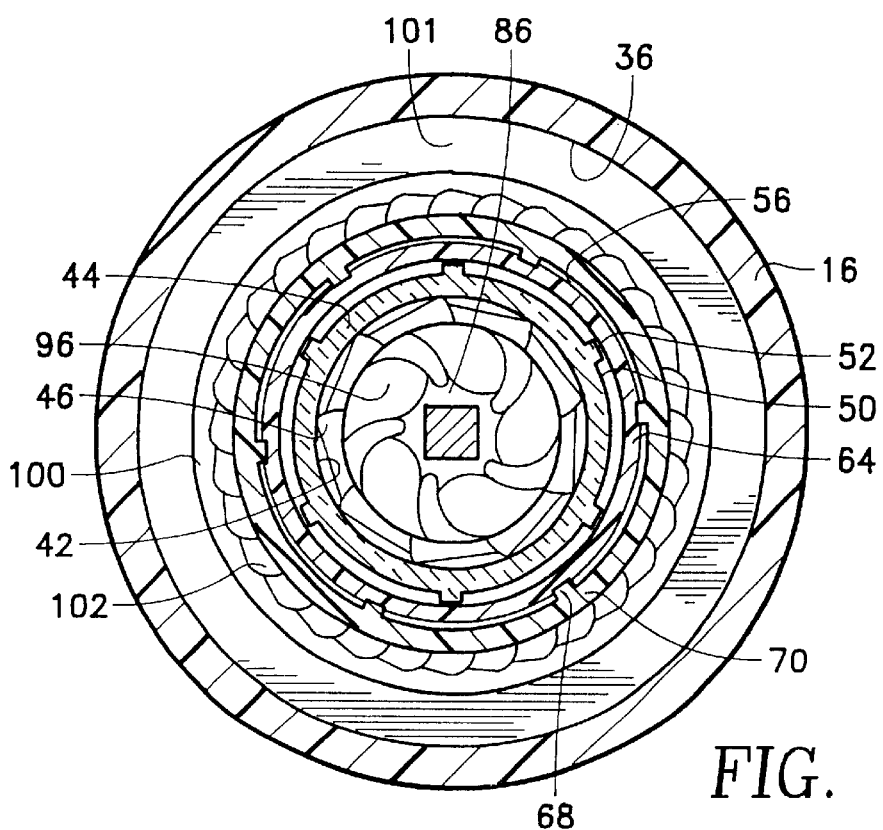
FIG. 8 is a cross-sectional view through the grinders incorporated within the condiment grinder apparatus of this invention taken through line 8—8 of FIG. 6.

Let it now be assumed that the user wishes to dispense pepper by operating a second condiment grinder. The user is to grasp the cap 12 and pivot such clockwise, as is shown depicted by the arrow 124 in FIG. 6 about an axis of rotation which also coincides with the longitudinal center axis of shaft 86 and the axis of rotation of the first condiment grinder. This will result in the upper ratchet gear 84 slipping relative to the middle ratchet gear 76. The middle ratchet gear 76 now connects with the lower ratchet gear 64. Since the lower ratchet gear 64 is fixed by the rails 68 to the base 16, rotation of the grinding sleeve 44 is prevented. However, by rotating of the shaft 86, the grinding plug 90 is pivoted or rotated. This means that there is relative movement occurring between the surfaces 46 and 98 and the peppercorns within the second annular grinding chamber 42 that fall within the gap 94 are pulverized and the pulverized pepper is then discharged into the bottom chamber 122 and exteriorly of the apparatus 10. Again, the amount of pivoting or rotating of the cap 12 will determine how much pepper will be dispensed into the bottom chamber 122.

For the purpose of preventing disengagement and losing of the nut 92, there is mounted a thin protective bar 126 across and over the nut 92 but spaced therefrom. The protective bar 126 is made integral with the base 16. It is to be understood that the coil spring 62 functions to exert a continuous bias tending to keep the gear teeth 72 engaged with the gear teeth 74 and the gear teeth 80 engaged with the gear teeth 82. However, when the rotational movement is applied to the cap 12, this rotational moment will be sufficient to cause either slippage to occur between the gear teeth 80 and 82 or between the gear teeth 72 and 74 depending upon the direction of turning.

The present invention may be embodied in other specific forms without departing from the essential attributes thereof. Reference should be made to the appending claims rather than the foregoing specification as indicating the scope of the invention.

What is claimed is:

1. A condiment grinder apparatus comprising:
    a housing having an upper end and a lower end;
    a first condiment grinder mounted within said housing and located at said lower end and having a first axis of rotation, a first condiment storage chamber located between said upper end and said lower end, condiment contained within said first condiment storage chamber is to be supplied to said first condiment grinder, said first condiment storage chamber being non-circular and substantially semi-cylindrical in configuration;

a second condiment grinder mounted in said housing and located at said lower end and having a second axis of rotation, a second condiment storage chamber located between said upper end and said lower end, condiment contained within said second condiment storage chamber is to be supplied to said second condiment grinder, said second condiment storage chamber being non-circular and substantially semi-cylindrical in configuration;

during operation of said first condiment grinder said second condiment grinder being not operable, during operation of said second condiment grinder said first condiment grinder being not operable;

a manually rotatable activator located at said upper end, rotation of said activator in one direction causes operation of said first condiment grinder and rotation in an opposite direction causes operation of said second condiment grinder;

said housing includes a single rotatable shaft, said first condiment grinder being directly attached to said shaft as is also said activator, rotation of said activator in said one direction causes rotation of said shaft and rotation of said first condiment grinder; and said shaft having mounted thereon an upper ratchet gear, said upper ratchet gear to connect with a middle ratchet gear, rotation of said activator in said opposite direction causes said upper ratchet gear to engage with said middle ratchet gear and cause rotation of said second condiment grinder.

2. The condiment grinder apparatus as defined in claim 1 wherein:

a lower ratchet gear attached to said housing, said middle ratchet gear to engage with said lower ratchet gear during rotation of said activator in said one direction which fixes said second grinder to said housing.

3. The condiment grinder apparatus as defined in claim 2 wherein:

a spring connected with said upper ratchet gear and said middle ratchet gear and said lower ratchet gear, said spring means exerting a continuous bias tending to connect together said upper ratchet gear with said middle ratchet gear and said lower ratchet gear.

4. A condiment grinder apparatus comprising:

a housing having an upper end and a lower end;

a first condiment grinder mounted within said housing and located at said lower end and having a first axis of rotation, a first condiment storage chamber located between said upper end and said lower end, condiment contained within said first condiment storage chamber is to be supplied to said first condiment grinder;

a second condiment grinder mounted in said housing and located at said lower end and having a second axis of rotation, a second condiment storage chamber located between said upper end and said lower end, condiment contained within said second condiment storage chamber is to be supplied to said second condiment grinder;

a manually rotatable activator located at said upper end, rotation of said activator in one direction causes operation of said first condiment grinder and rotation in an opposite direction causes operation of said second condiment grinder;

said housing includes a single rotatable shaft, said first condiment grinder being directly attached to said shaft as is also said activator, rotation of said activator in said one direction causes rotation of said shaft and rotation of said first condiment grinder; and said shaft having mounted thereon an upper ratchet gear, said upper ratchet gear to connect with a middle ratchet gear, rotation of said activator in said opposite direction causes said upper ratchet gear to engage with said middle ratchet gear and cause rotation of said second condiment grinder.

5. The condiment grinder apparatus as defined in claim 4 wherein:

a lower ratchet gear attached to said housing, said middle ratchet gear to engage with said lower ratchet gear during rotation of said activator in said one direction which fixes said second grinder to said housing.

6. The condiment grinder apparatus as defined in claim 5 wherein:

a spring connected with said upper ratchet gear and said middle ratchet gear and said lower ratchet gear, said spring means exerting a continuous bias tending to connect together said upper ratchet gear with said middle ratchet gear and said lower ratchet gear.

7. The condiment grinder apparatus as defined in claim 4 wherein:

said activator including a plug which is attached to said shaft, when said plug is disconnected from said shaft said activator is separable from said housing.

8. The condiment grinder apparatus as defined in claim 7 wherein:

said plug being movable between a retracted position and an extended position, with said plug in said retracted position said plug is located substantially flush with said upper end and access to said plug to disconnect same from said shaft is not provided, with said plug in said extended position said plug can be manually operated to disconnect same from said shaft.

9. The condiment grinder apparatus as defined in claim 8 wherein:

said plug being movable between a retracted position and an extended position, with said plug in said retracted position said plug is located substantially flush with said upper end and access to said plug to disconnect same from said shaft is not provided, with said plug in said extended position said plug can be manually operated to disconnect same from said shaft.

* * * * *